United States Patent
Khanna et al.

(10) Patent No.: US 10,524,117 B2
(45) Date of Patent: Dec. 31, 2019

(54) METHOD AND SYSTEM FOR CONFIGURING A MOBILE DEVICE

(71) Applicant: NXP B.V., Eindhoven (NL)

(72) Inventors: Love Khanna, Bangalore (IN); Anil Hiranniah, Bangalore (IN); Laurent Tricheur, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/657,108

(22) Filed: Jul. 21, 2017

(65) Prior Publication Data

US 2018/0027409 A1 Jan. 25, 2018

(30) Foreign Application Priority Data

Jul. 22, 2016 (EP) .................... 16305949

(51) Int. Cl.
*H04W 8/24* (2009.01)
*H04W 4/029* (2018.01)
(Continued)

(52) U.S. Cl.
CPC .............. *H04W 8/245* (2013.01); *H04B 5/00* (2013.01); *H04B 5/0056* (2013.01);
(Continued)

(58) Field of Classification Search
CPC ..... H04W 4/008; H04W 4/021; H04W 12/06; H04W 8/24; H04W 4/02; H04W 4/023; H04W 4/22; H04W 52/0225; H04W 52/0245; H04W 52/283; H04W 84/12; H04W 12/04; H04W 12/08; H04W 4/12; H04W 4/20; H04W 64/00
(Continued)

(56) References Cited

U.S. PATENT DOCUMENTS 8,861,733 B2 10/2014 Benteo et al.
9,374,134 B2 6/2016 Hillan et al.
(Continued)

FOREIGN PATENT DOCUMENTS

EP 3 029 960 A1 6/2016
WO WO-2012/065643 A1 5/2012
WO WO-2015/110837 A2 7/2015

OTHER PUBLICATIONS

"NFC Controller Interface (NCI) Specification", Technical Specification, NFC Forum, NCI 1.0, NFCForum-TS-NCI-1.0, 146 pgs., retreived from the internet at: https://cardsys.dk/download/NFC_Docs/NFC%20Controller%20Interface%20(NCI)/%20Technical%20Specification.pdf (Nov. 6, 2012).
(Continued)

*Primary Examiner* — Ajibola A Akinyemi

(57) ABSTRACT

According to a first aspect of the present disclosure, a method of configuring a mobile device is conceived, comprising: determining a geographical location of said mobile device; retrieving one or more near field communication settings specific to the geographical location; applying and storing the near field communication settings to the mobile device. According to a second aspect of the present disclosure, a corresponding computer program is provided. According to a third aspect of the present disclosure, a corresponding system for configuring a mobile device is provided.

19 Claims, 4 Drawing Sheets

(51) Int. Cl.
    *H04W 4/60*     (2018.01)
    *H04W 4/80*     (2018.01)
    *H04B 5/00*     (2006.01)
    *H04W 4/50*     (2018.01)
    *H04W 64/00*     (2009.01)
    *H04L 29/08*     (2006.01)

(52) U.S. Cl.
    CPC ............. *H04W 4/029* (2018.02); *H04W 4/50* (2018.02); *H04W 4/60* (2018.02); *H04W 4/80* (2018.02); *H04L 67/10* (2013.01); *H04W 64/00* (2013.01)

(58) Field of Classification Search
    USPC ........................................................ 455/41.2
    See application file for complete search history.

(56) References Cited

U.S. PATENT DOCUMENTS

| | | | |
|---|---|---|---|
| 2004/0266454 A1 | 12/2004 | Nielsen et al. | |
| 2008/0227471 A1* | 9/2008 | Dankar | G06Q 20/3224 |
| | | | 455/456.6 |
| 2012/0034933 A1* | 2/2012 | Bradley | H04W 12/06 |
| | | | 455/456.3 |
| 2012/0094598 A1* | 4/2012 | Tysowski | H04W 4/029 |
| | | | 455/41.1 |
| 2012/0208551 A1 | 8/2012 | Hill | |
| 2012/0220219 A1* | 8/2012 | Hill | G06K 19/0776 |
| | | | 455/41.1 |
| 2013/0109409 A1* | 5/2013 | Ortiz | H04W 4/023 |
| | | | 455/456.3 |

OTHER PUBLICATIONS

Extended European Search Report for Patent Appln. No. 16305949.6 (dated Dec. 22, 2016).

* cited by examiner

METHOD AND SYSTEM FOR CONFIGURING A MOBILE DEVICE

CROSS-REFERENCE TO RELATED APPLICATIONS

This application claims the priority under 35 U.S.C. § 119 of European patent application no. 16305949.6, filed on Jul. 22, 2016, the contents of which are incorporated by reference herein.

FIELD

The present disclosure relates to a method for configuring a mobile device. Furthermore, the present disclosure relates to a corresponding computer program. Furthermore, the present disclosure relates to a corresponding system for configuring a mobile device.

BACKGROUND

Near field communication (NFC) is used to execute transactions in various environments. For example, in the public transportation sector, contactless smart cards are often used to pay fares. Also, NFC-enabled mobile devices, such as smart phones and tablets, may be used to execute such transactions.

SUMMARY

According to a first aspect of the present disclosure, a method for configuring a mobile device is conceived, comprising: determining a geographical location of said mobile device; retrieving one or more near field communication settings specific to the geographical location; applying and storing the near field communication settings to the mobile device.

In one or more embodiments of the method, the near field communication settings are communication protocol settings.

In one or more embodiments of the method, the near field communication settings comprise one or more of: at least one NFC Controller Interface parameter, at least one Radio Frequency setting, at least one control flag.

In one or more embodiments of the method, determining the geographical location comprises receiving a Global Positioning System signal and deriving the geographical location from said signal.

In one or more embodiments of the method, determining the geographical location comprises receiving data indicative of said location through a data network or using a location of one or more mobile network towers.

In one or more embodiments of the method, retrieving the near field communication settings specific to the geographical location comprises retrieving one or more predefined settings from a server through a data network.

In one or more embodiments of the method, the mobile device is preconfigured with one or more default near field communication settings.

In one or more embodiments, the steps of retrieving the near field communication settings and applying the near field communication settings are only performed if the geographical location of the mobile device has changed.

According to a second aspect of the present disclosure, a computer program is provided, comprising non-transient executable instructions which, when being executed by a processing unit, cause said processing unit to perform a method of the kind set forth.

According to a third aspect of the present disclosure, a system for configuring a mobile device is provided, comprising: a location determination unit configured to determine a geographical location of said mobile device; a settings retrieval unit configured to retrieve one or more near field communication settings specific to the geographical location; a settings application unit configured to apply and store the near field communication settings to the mobile device.

In one or more embodiments of the system, the near field communication settings are communication protocol settings.

In one or more embodiments of the system, the near field communication settings comprise at least one NFC Controller Interface parameter, at least one Radio Frequency setting, and/or at least one control flag.

In one or more embodiments of the system, the location determination unit is configured to determine the geographical location by receiving a Global Positioning System signal and deriving the geographical location from said signal.

In one or more embodiments of the system, the location determination unit is configured to determine the geographical location by receiving data indicative of said location through a data network or by using a location of one or more mobile network towers.

In one or more embodiments, a mobile device comprises a system of the kind set forth.

DESCRIPTION OF DRAWINGS

Embodiments will be described in more detail with reference to the appended drawings, in which.

DESCRIPTION OF EMBODIMENTS

As mentioned, near field communication (NFC) is used to execute transactions in various environments. For example, in the public transportation sector, contactless smart cards are often used to pay fares. Also, NFC-enabled mobile devices, such as smart phones and tablets, may be used to execute such transactions. In particular, automatic fare collection (AFC) may be based on the use of NFC-enabled mobile devices on which contactless smart cards are emulated. In that case, a computer program (often referred to as a wallet application) executes NFC transactions with a terminal device (i.e., an NFC reader) through an NFC interface of the mobile device on which said program is executed. However, the use of a large, heterogeneous reader infrastructure may complicate the execution of such transactions.

Figure 1:
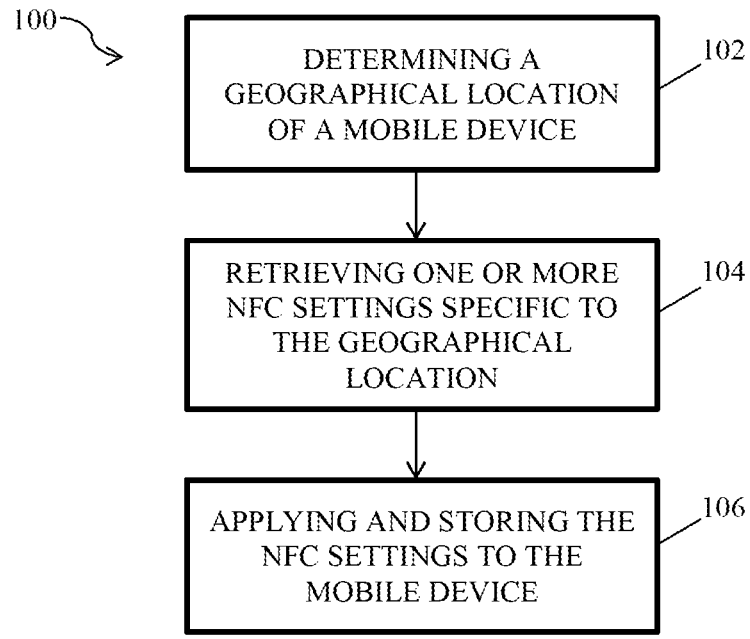
FIG. 1 shows an illustrative embodiment of a configuration method.

FIG. 1 shows an illustrative embodiment of a method 100 for configuring a mobile device. The configuration method 100 comprises, at 102, determining a geographical location of the mobile device. Furthermore, the configuration method 100 comprises, at 104 retrieving one or more NFC settings specific to the geographical location, and, at 106, applying and storing the retrieved NFC settings to the mobile device. In particular, the inventors have realized that AFC terminals in particular geographical locations, for example a city, province or state, require specific NFC settings. By automatically retrieving, applying and storing location-specific NFC settings, NFC transactions may reliably and quickly be executed across a wide geographical area.

Figure 2:
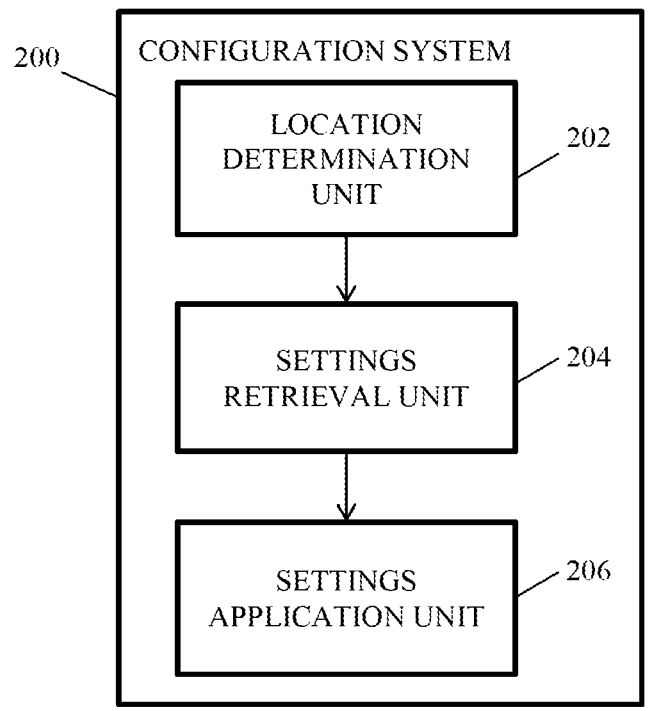
FIG. 2 shows an illustrative embodiment of a configuration system.

FIG. 2 shows an illustrative embodiment of a corresponding system 200 for configuring a mobile device. The system 200 comprises a location determination unit 202 configured to determine a geographical location of the mobile device. The geographical location may for example be a city, a province or a state. In a practical example, the location determination unit 202 may determine geographic coordinates of the present location of the mobile device and map these coordinates to a city, a province, or a state. Furthermore, the system 200 comprises a settings retrieval unit 204 configured to retrieve one or more NFC settings specific to the geographical location. In a practical and efficient implementation, the settings retrieval unit 204 may retrieve the NFC settings from a server. The server may for example contain one or more predefined NFC settings that are stored in a permanent or semi-permanent memory. In another practical example, the settings retrieval unit 204 may retrieve the NFC settings from a memory embedded in the mobile device itself: it may be envisaged that a plurality of different location-specific NFC settings are stored in the mobile device. Furthermore, the system 200 comprises a settings application unit 206 configured to apply and store the retrieved NFC settings to the mobile device. In a practical example, applying the NFC settings may be done by copying the NFC settings to predefined areas of memory used by the NFC circuitry. It is noted that the system 200 may be fully embedded in the mobile device. Furthermore, the different units 202, 204, 206 or parts thereof may be implemented as different computer programs. Alternatively, some or all of the units 202, 204, 206, or parts thereof, may be implemented as a single computer program. Furthermore, some functions of the units 202, 204, 206 may be implemented in hardware.

In one or more embodiments, the NFC settings are communication protocol settings. The NFC protocol, based on the standards ISO/IEC 18092 and ISO/IEC 14443, may employ different settings, such as parameters related to protocol activation and data exchange methods. It may be advantageous to automatically retrieve and apply such settings to the mobile device, in order to achieve the aforementioned reliable and quick execution of NFC transactions across a wide geographical area. Furthermore, in one or more embodiments, the NFC settings comprise one or more of: at least one NFC Controller Interface parameter, at least one Radio Frequency setting, at least one control flag. The NFC interface, as defined by the standard ISO/IEC 18092, may employ different Radio Frequency (RF) settings, such as parameters related to modulation schemes, codings, transfer speeds, and frame format of the RF interface. It may be advantageous to automatically retrieve and apply such RF settings to the mobile device, in order to achieve the aforementioned reliable and quick execution of NFC transactions across a wide geographical area. Furthermore, in case the NFC Controller Interface (NCI) technical specification is used, NCI parameters may be need to configured. The NFC technical specification is published by the NFC Forum as the "NFC Controller Interface (NCI) Specification", Technical Specification, NFC Forum, NCI 1.0, NFC-Forum-TS-NCI-1.0, on 2012-11-06. It may be advantageous to automatically retrieve and apply such NCI parameters to the mobile device, in order to achieve the aforementioned reliable and quick execution of NFC transactions across a wide geographical area. Furthermore, control flags may have to be set in the mobile device, for example software, firmware or middleware flags that are used to control the RF interface. It may be advantageous to automatically retrieve and apply such control flags to the mobile device, in order to achieve the aforementioned reliable and quick execution of NFC transactions across a wide geographical area.

In a practical and efficient implementation, determining the geographical location comprises receiving a Global Positioning System (GPS) signal and deriving the geographical location from said signal. As mentioned above, the location determination unit 202 may determine geographic coordinates of the present location of the mobile device and map these coordinates to a city, a province, or a state. In this example, the location determination unit 202 may use to the GPS signal to determine the geographic coordinates of the present location of the mobile device. Alternatively or in addition, determining the geographical location comprises receiving data indicative of said location through a data network or using a location of one or more mobile network towers. It may be envisaged, for instance, that mapping the geographic coordinates to a city, a province, or a state, is performed by a server, and that the location determination unit 202 transmits the coordinates through a data network to said server and receives a city identifier, province identifier or state identifier in response.

Furthermore, in one or more embodiments, the mobile device is preconfigured with one or more default NFC settings. In this way, the mobile device may be capable of communicating with at least some NFC readers even if it has not been configured yet in dependence on its present location. Also, if the wallet application is disabled or has been deleted by accident, for example, the mobile device may be capable of communicating with at least some NFC readers. The mobile device may be preconfigured with frequently used NFC settings, for example.

Furthermore, the steps of retrieving the NFC settings and applying the NFC settings to the mobile device are only performed if the geographical location of the mobile device has changed. For instance, the location determination unit 202 may periodically determine the geographical location of the mobile device and compare this location with a previously determined location. If the geographical location has changed, the location determination unit 202 may trigger the settings retrieval unit 204 to retrieve the NFC settings specific to the new location. Subsequently, the settings application unit 206 may apply those NFC settings. In this way, unnecessary operations may be avoided and the power consumption of the mobile device may be reduced.

Figure 3:
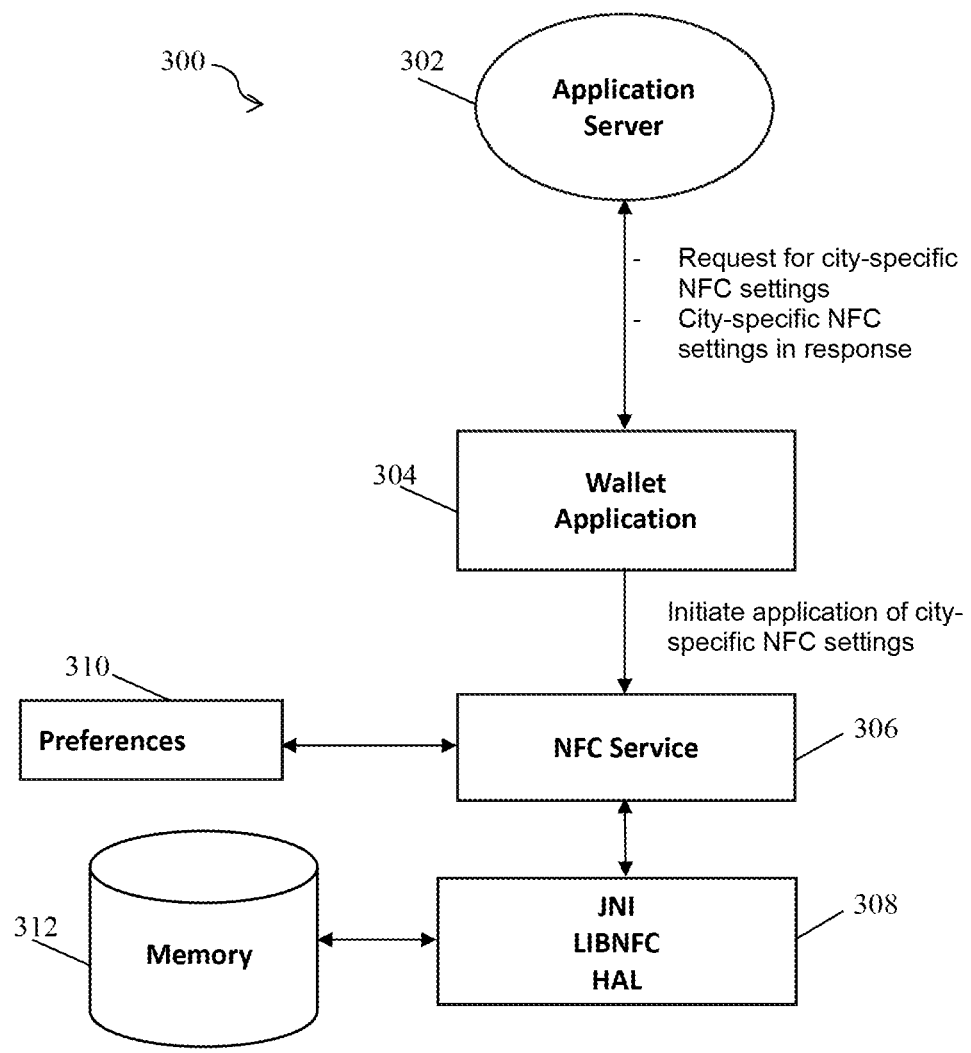
FIG. 3 shows another illustrative embodiment of a configuration system.

FIG. 3 shows another illustrative embodiment of a configuration system 300. In particular, a more detailed example of a configuration system 300 is shown. The system 300 comprises an application server 302. Furthermore, the system 300 comprises a wallet application 304, an NFC service application 306, a library block 308 that contains a Java Native Interface (JNI), an NFC Controller Interface (LIB-NFC) and an NFC Controller-specific Hardware Abstraction Layer (HAL), and a memory 312. It is noted that the application server 302 is external to the mobile device, while the other components may be implemented in the mobile device. The wallet application may contain the location determination unit 302 or it may retrieve the geographical location from a location service application (not shown)

executed by the mobile device. Note that this location service application may also automatically detect a change of geographical location and trigger the wallet application 304 to perform or initiate an NFC settings update if the geographical location of the mobile device has changed. In either case, the wallet application 304 may transmit a request for location-specific NFC settings to the application server 302. In the present example, city-specific NFC settings are requested. The application server 302 may transmit a response containing the location-specific NFC settings to the wallet application. Thus, in this example, the wallet application contains the settings retrieval unit 204. Furthermore, the wallet application 304 may initiate the application of the location-specific NFC settings by instructing the NFC service application 306 to apply them. The NFC service application 306, in turn, contains the settings application unit 36. In operation, in addition to general preferences 310, the NFC service application 306 may apply the location-specific NFC settings to the mobile device. Applying such settings is typically done through libraries 308 (JNI, LIBNFC, HAL). Furthermore, the location-specific NFC settings may be stored in memory 312 so that said libraries 308 can easily access them. It is noted that, in this example, the libraries JNI, LIBNFC, HAL are specific to the Android platform. The skilled person will appreciate that other libraries are used on a Windows platform or an IOS platform, for example.

Figure 4:
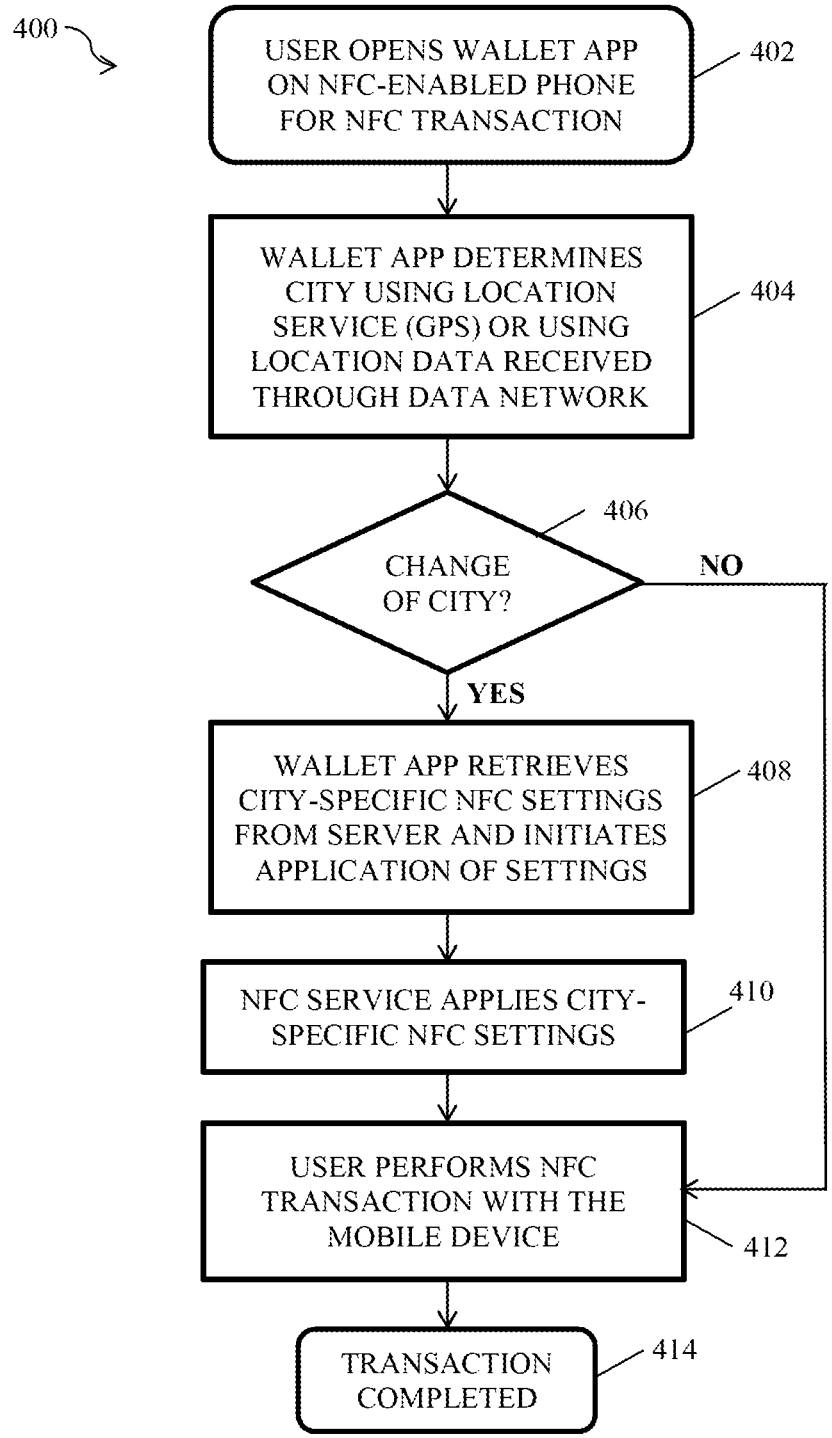
FIG. 4 shows an illustrative embodiment of a transaction execution method.

FIG. 4 shows an illustrative embodiment of a transaction execution method 400. The transaction execution method 400 may for example be an NFC-based transaction (referred to as "NFC transaction") for paying a fare. At 402, user opens a wallet application on an NFC-enabled mobile phone, in order to execute an NFC transaction. At 404, the wallet application determines the geographical location of the phone, in this case the city in which the phone is presently located. For instance, the wallet application may request a GPS-based or mobile network-based location service application to provide the geographic coordinates of the phone and subsequently the wallet application may map these coordinates to a city, or the location service application may perform this mapping and provide a city identifier to the wallet application. Alternatively or in addition, the wallet application may use location data received through a data network for determining the city in which the phone is presently located. At 406, the wallet application checks if the city in which the phone is located has changed. If so, then the wallet application retrieves, at 408, city-specific NFC settings from a server and initiates the application of these settings. Alternatively, as mentioned above, the location service application may check if the city has changed and trigger the wallet application to retrieve the city-specific NFC settings and initiate their application only if the geographical location of the mobile device has changed. At 410, the NFC service application applies the city-specific NFC settings. At 412, the user performs the NFC transaction with the mobile device. Finally, at 414, the NFC transaction is completed.

Figure 5:
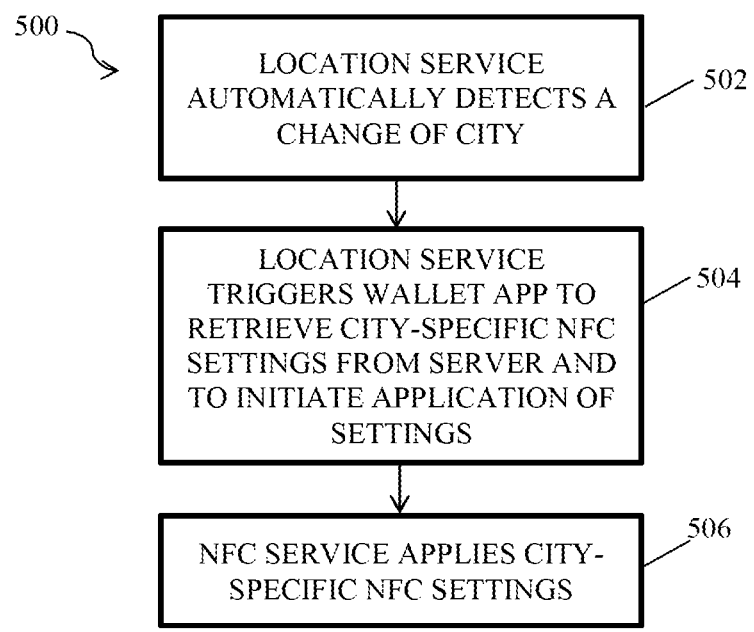
FIG. 5 shows another illustrative embodiment of a configuration method.

FIG. 5 shows another illustrative embodiment of a configuration method 500. In particular, in this embodiment, the wallet application does not need to determine the city (i.e., the location), but instead the location service automatically detects, at 502, a change of city. Then, at 504, the location service triggers the wallet application to retrieve city-specific NFC settings from a server and to initiate the application of these settings. Furthermore, at 506, the NFC service application applies the city-specific NFC settings.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet, etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the an will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 configuration method
102 determining a geographical location of a mobile device
104 retrieving one or more NFC settings specific to the geographical location
106 applying and storing the NFC settings to the mobile device
200 configuration system
202 location determination unit
204 settings retrieval unit
206 settings application unit
300 configuration system
302 application server
304 wallet application
306 NFC service
308 JNI, LIBNFC, HAL
310 preferences
312 memory
400 transaction execution method
402 user opens wallet app on NFC-enabled phone for NFC transaction
404 wallet app determines city using location service (GPS) or using location data received through data network
406 change of city?
408 wallet app retrieves city-specific NFC settings from server and initiates application of settings
410 NFC service applies city-specific NFC settings
412 user performs NFC transaction with the mobile device
414 transaction completed
500 configuration method
502 location service automatically detects a change of city
504 location service triggers wallet app to retrieve city-specific NFC settings from server and to initiate application of settings
506 NFC service applies city-specific NFC settings

The invention claimed is:

1. A method for configuring a mobile device, comprising:
determining a geographical location, via a location determination circuit, corresponding to a current location of said mobile device;
based on the determined geographical location and by using circuitry in the mobile device, retrieving one or more near field communication (NFC) settings from a server through a data network connection, the one or more NFC settings including communication protocol settings that are specific to the determined geographical location, wherein the one or more NFC settings is retrieved for the determined geographical location as opposed to a different set of NFC settings stored and available to the mobile device for a different geographic location, the communication protocol settings including parameters indicative of protocol activation and data exchange methods; and
applying and storing, using the circuitry in the mobile device, the one or more NFC settings to the mobile device, wherein the applying and storing comprises:
updating settings of an NFC interface of the mobile device to a new configuration according to the one or more NFC settings retrieved from the server through the data network connection, wherein the new configuration enables the NFC interface to establish an NFC transaction session with an NFC terminal device.

2. A method as claimed in claim 1, further comprising: in response to detection of the determined geographical location being changed, retrieving, using the circuitry in the mobile device, a new set of one or more NFC settings for the changed geographical location and updating settings of the NFC interface to another new configuration according to the new set of one or more NFC settings.

3. A method as claimed in claim 1, wherein the one or more NFC settings comprise one or more of: an NFC Controller Interface parameter, a Radio Frequency setting, a control flag, a modulation scheme, a coding, a transfer speed, and a frame format of an radio frequency frame.

4. A method as claimed in claim 1, wherein determining the geographical location comprises receiving a Global Positioning System signal and deriving the geographical location from said signal.

5. A method as claimed in claim 1, wherein determining the geographical location comprises receiving data indicative of the geographical location through the data network or using a location of one or more mobile network towers.

6. A method as claimed in claim 1, wherein the one or more NFC settings are stored in a predefined area of memory of the mobile device.

7. A method as claimed in claim 1, wherein the mobile device is preconfigured with one or more default NFC settings.

8. A method as claimed in claim 1, wherein determining the geographical location of the mobile device includes obtaining geographic coordinates of the current location of the mobile device and mapping the geographic coordinates to a location identifier of a country, state, city, or province.

9. A method as claimed in claim 1, further comprising: executing, by the mobile device, an NFC transaction with the NFC terminal device using the new configuration of the NFC interface.

10. A system for configuring a mobile device, comprising:
a location determination unit, including circuitry, configured to determine a geographical location of said mobile device;
a settings retrieval unit, including circuitry, configured to retrieve one or more near field communication (NFC) settings from a server through a data network connection, the one or more NFC settings indicative of communication protocols that are specific to the determined geographical location, wherein the one or more NFC settings is retrieved for the determined geographical location as opposed to a different set of NFC settings stored and available to the mobile device for a different geographic location; and
a settings application unit, including circuitry, configured to apply and store the one or more NFC settings to the mobile device, wherein the settings application unit is further configured to update settings of an NFC interface of the mobile device to a new configuration according to the one or more NFC settings, wherein the new configuration enables the NFC interface to establish an NFC transaction session with an NFC terminal device.

11. A system as claimed in claim 10, wherein the communication protocol settings include parameters indicative of protocol activation and data exchange methods.

12. A system as claimed in claim 10, wherein the one or more near field communication settings comprise one or more of: a NFC Controller Interface parameter, a Radio Frequency setting, a control flag, a radio frequency modulation scheme, a coding, a transfer speed, and a frame format of the radio frequency.

13. A system as claimed in claim 10, wherein the location determination unit is configured to determine the geographical location by receiving a Global Positioning System signal and deriving the geographical location from said signal.

14. A system as claimed in claim 10, wherein the location determination unit is configured to determine the geographical location by receiving data indicative of said location through a data network or by using a location of one or more mobile network towers and mapping the received data or the location to country, state, city, or province.

15. A mobile device comprising a system as claimed in claim 10.

16. A system as claimed in claim 10, further including a wallet application that includes the settings retrieval unit and the settings application unit, wherein the wallet application further includes a processing circuit configured to execute an NFC transaction with the NFC terminal device through the NFC interface using the new configuration according to the one or more NFC settings.

17. A system as claimed in claim 10, wherein the NFC terminal device includes an automatic fare collection terminal that implements an NFC protocol specific to the geographical location.

18. A system as claimed in claim 17, wherein the processing circuit is further configured and arranged to determine that the mobile device has changed locations based on a new determined geographical location, and in response, the settings retrieval unit is configured to retrieve a new set of one or more NFC settings for the new determined geographical location and update settings of the NFC interface to another new configuration according to the new set of one or more NFC settings.

19. A system as claimed in claim 17, wherein the one or more NFC settings are stored in a predefined area of memory of the mobile device.

* * * * *